United States Patent
Chambers et al.

[11] B 4,001,475
[45] Jan. 4, 1977

[54] ABLATIVE SURFACE INSULATOR

[75] Inventors: Joseph W. Chambers, Woodland Hills, Calif.; Lester E. McTaggart, Jackson, Tenn.

[73] Assignee: The United States of America as represented by the Secretary of the Air Force, Washington, D.C.

[22] Filed: May 9, 1974

[21] Appl. No.: 468,330

[44] Published under the second Trial Voluntary Protest Program on March 16, 1976 as document No. B 468,330.

[52] U.S. Cl. .............................. 428/175; 428/179; 428/198; 428/209; 428/225; 428/246; 428/269; 428/285

[51] Int. Cl.² .......................................... B32B 1/00

[58] Field of Search .................. 161/82, 88, 89, 90, 161/95, 121, 122, 123, 133, 137, 144, 148, 213

[56] References Cited
UNITED STATES PATENTS

| | | | |
|---|---|---|---|
| 2,384,157 | 9/1945 | Burke | 161/133 |
| 2,992,151 | 7/1961 | Niessen | 161/137 |
| 3,130,112 | 4/1964 | Anderson | 161/133 |
| 3,212,956 | 10/1965 | Yoshikawa | 161/133 |
| 3,265,556 | 8/1966 | Hungerford et al. | 161/133 |
| 3,341,395 | 9/1967 | Weber | 161/133 |
| 3,352,739 | 11/1967 | Blue | 161/89 |
| 3,449,157 | 6/1969 | Wandel | 161/137 |
| 3,530,033 | 9/1970 | Hildebrandt | 161/144 |
| 3,565,734 | 2/1971 | Shanok et al. | 161/213 |
| 3,655,502 | 4/1972 | Yoshikawa | 161/148 |
| 3,679,537 | 7/1972 | Huer et al. | 161/89 |

*Primary Examiner*—George F. Lesmes
*Assistant Examiner*—James J. Bell
*Attorney, Agent, or Firm*—Joseph E. Rusz; Jacob N. Erlich

[57] ABSTRACT

An ablative surface insulator having a basket-like open weave of metal strips, convoluted on a one inch pitch and having a spacing of one-half inch between center lines of the strips is attached to a base material to be protected. A suitable elastomeric material which provides thermal protection by pyrolytic charring is molded on the woven metal structure.

4 Claims, 2 Drawing Figures

ABLATIVE SURFACE INSULATOR

BACKGROUND OF THE INVENTION

This invention relates generally to heat resistant articles, and, more particularly, to an ablative surface for protecting a base material from the deleterious effects of extreme heat.

There has long existed a need for an insulation which will protect a base material from oxidation and erosion while exposed to a very hot gaseous fluid and which itself is mechanically and chemically able to withstand high temperatures and protect the base material from thermal shock while it is withstanding rapid and extensive changes in temperature. Such an insulation, if provided, would be of much value when employed as a high temperature furnace lining, a protective covering for a heat treating rack or a lining for a rocket nozzle, etc.

The insulation may be in the form of an ablative surface, that is, one which chars and wears away because it is exposed to high temperature or is moving at high speed in relation to a fluid with which it is in contact. In wearing away, the ablative surface prevents frictional heat from destroying the base material on which it is deposited, by utilizing several heated-transfer mechanisms.

Certain elastomeric moldable materials (which form pyrolitic chars) such as Dow Corning 93-104 or General Electric RTV-1300 can provide this type of thermal protection. The problem, however, is that the high interface temperature between a combustion chamber structure, for example, and the insulative materials negates the use of conventional chemical adhesives when the interface temperature exceeds 700°F. This situation occurs since chemical adhesives pyrolitically decompose between 400° and 700°F.

SUMMARY OF THE INVENTION

The instant invention sets forth a system which allows for the successful retention of the elastomeric material.

In this invention the incorporation of a matrix of metal strips physically attached to a base material permits the successful retention. The metal strips become an integral part of the insulator and surface to retain the virgin material and residual pyrolitic char. The metal strips are convoluted on a 1 inch pitch with an amplitude equal to 0.6 of the finished height of the ablative insulator. Metal strips are attached to the base material by spot welding each contact point between the strip and the base material. The strips are installed in a diagonal matrix with nodes of the strips in one direction matching the strips in the other direction.

The elastomeric ablative is molded thereover to the desired thickness and then cured. In this way the metal strips become bound into the insulator. On pyrolitic composition of the elastomere material, the integral metal strips serve to retain the residual char which serve as an insulator for the duration of the application of the extreme heat in, for example, a combustion chamber operation.

It is therefore an object of this invention to provide an ablative surface insulation which maintains its physical attachment to the base material to which it is attached.

It is a further object of this invention to provide an ablative surface insulation which is retained on the base material even as a residual char.

It is a further object of this invention to provide an ablative surface insulator which is economical to produce and which utilizes conventional, currently available components that lend themselves to standard mass producing manufacturing techniques.

For a better understanding of the present invention together with other and further objects thereof, reference is made to the following description taken in connection with the accompanying drawing and its scope will be pointed out in the appended claims.

DETAILED DESCRIPTION OF THE PREFERRED EMBODIMENT

Figure 1:
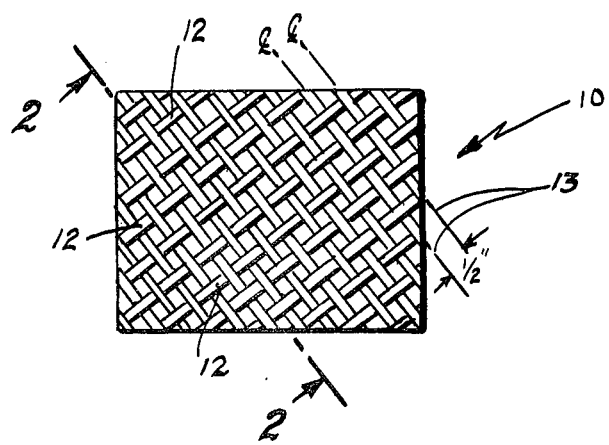
FIG. 1 is a reduced plan view of the metal strips of this invention in position upon a base material before application of the elastomeric insulating material.
Figure 2:
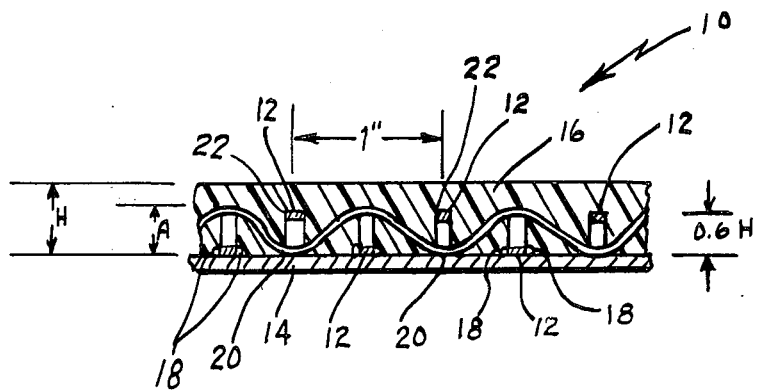
FIG. 2 is a side elevational view shown partly in cross section of the completed ablative surface insulation of this invention including the elastomeric material and taken along lines 2—2 of FIG. 1.

Reference is now made to FIGS. 1 and 2 of the drawing which show in detail the ablative insulating structure 10 of this invention. In this invention a plurality of metal strips 12 made of any suitable material capable of withstanding extremely high temperatures (exceeding 700°F) such as 321 Stainless Steel are secured to the base material 14 in a manner to be described hereinbelow.

The metal strips 12 are convoluted having a pitch of approximately 1 inch and a spacing of approximately ½ inch between the center lines 13 of strips 12. The amplitude A of the convoluted strips 12 is approximately equal to 0.6 of the finished height, H, of the ablative insulator 16 to be applied at a later time. The metal strips are interwoven and secured to the base material 14 by any suitable securing method such as by spot welding at each contact point 18. The metal strips 12 are arranged in such a manner that they form a diagonal matrix (see FIG. 1) with nodes 20 of the strips 12 in one direction matching the peaks 22 in the other direction (see FIG. 2).

Once the metal strips 12 are secured in place and deemed to be clean any suitable silicone primer/adhesive is applied to strips 12. A silicone elastomeric ablative material such as Dow Corning 93-104 or General Electric RTV-1300 both of which essentially comprise of a silicone rubber with carbon and silica filler materials, is then molded over strips 12 to the desired thickness (approximately 1.67 the amplitude, A, of the metal strips 12) and cured. Metal strips 12 then become integrally bound into ablative insulator 16. On the pyrolytic decomposition of the elastomer ablative material 16, the integral metal strips 12 retain the residual char which remains after the application of extreme heat to the material in, for example, a combustion chamber operation.

Although this invention has been described with reference to a particular embodiment which will be understood to those skilled in the art that this invention is also capable of a variety of alternate embodiments within the spirit and scope of the appended claims.

We claim:

1. An ablative surface insulation for withstanding extreme temperature comprising a plurality of interwoven strips of metal capable of withstanding temperatures in excess of 700°F fixedly secured to a base material which is incapable of withstanding said extreme temperature, said strips being formed in a convoluted design producing a diagonal matrix having nodes and peaks, said nodes of said strips in one direction matching said peaks in another direction, a silicone elastomeric insulating material molded to and encompassing said plurality of strips and said convoluted strips having a pitch of approximately 1 inch and having an amplitude equal to approximately 0.6 the height of said insulating material.

2. An ablative surface insulation as defined in claim 1 wherein said insulating material is capable of leaving a residual char when exposed to said extreme temperature.

3. An ablative surface insulation as defined in claim 2 wherein said strips of metal are made of stainless steel.

4. An ablative surface insulation as defined in claim 3 wherein said strips are secured to said base material by spot welding.

* * * * *